Jan. 19, 1971  S. R. CUDNOHUFSKY  3,555,941
TRACER CONTROL CIRCUIT WITH SIZING MEANS
Filed April 25, 1969  2 Sheets-Sheet 1

INVENTOR.
SYLVESTER R. CUDNOHUFSKY
BY
Barnes, Kisselle, Raisch & Choate
ATTORNEYS United States Patent Office 3,555,941
Patented Jan. 19, 1971

3,555,941
TRACER CONTROL CIRCUIT WITH SIZING MEANS
Sylvester R. Cudnohufsky, 1290 Lake Angelus
Shore Drive, Pontiac, Mich. 48055
Filed Apr. 25, 1969, Ser. No. 819,364
Int. Cl. B23b 3/28; B23q 35/22
U.S. Cl. 82—14                                   17 Claims

ABSTRACT OF THE DISCLOSURE

A size control arrangement in a hydraulic tracer control circuit for a machine tool such as a lathe. The tracer control circuit includes a tracer control valve that is variably restricted by a template engaging stylus so as to balance the forces at opposite ends of the cutting tool actuating cylinder and thereby position the cutting tool or tools in a predetermined position relative to the work. A bypass passageway around the tracer valve includes a manually adjustable restrictor for varying the amount of pressure fluid diverted around the tracer valve to thereby vary the position of the cutting tool relative to the work.

---

This invention relates to a hydraulic tracer control circuit and more particularly to a hydraulic tracer control circuit which includes hydraulically controlled means for adjusting positional relationship between the cutting tool and the tracer template to vary the size of the workpiece being machined.

The invention disclosed herein is an improvement on the tracer control circuit disclosed in my U.S. Pat. No. 2,940,263, dated June 14, 1960. As illustrated in said patent, the elements of a tracer controlled machine tool conventionally include a template, a stylus which contacts the template and which is part of or operates the main tracer control valve, the main control valve itself and the actuation devices. The actuation devices (hydraulic cylinders, for example) operate a compound slide, the lower component of which is referred to as the main slide and in a lathe, for example, moves longitudinally along the bed of the lathe while the upper component (normally referred to as a cross-slide) feeds transversely of the lathe bed. The cutting tools and the main valve are usually mounted on the cross-slide and the template is usually mounted in a fixed position on the lathe.

With an arrangement as described above when the system is properly adjusted and the tracer stylus is in full contact with the template, the tool is cutting the workpiece along the desired finished contour. However, cutting tools wear or break and consequently must be reset or replaced from time to time. The step of resetting or replacing a cutting tool usually results in deviations from the desired relationship between the tool and the template. Under such circumstances it is common practice to re-adjust the stylus or the main valve so as to establish the desired relationship between the tool and the template. Normally this is done by mounting the main valve on a small, manually-operated, auxiliary slide mounted on the cross-slide. Such an auxiliary slide is commonly referred to as a microslide and employs a lead screw and a micrometer. Re-adjustment of the relationship between the cutting tool and the template by means of a microslide involves several disadvantages and leads to possible error. The possibility of error results from variations in stylus-template bearing pressure, backlash in the lead screw and the commercial tolerances to which the lead screw is machined.

It is an object of this invention to provide a hydraulic control mechanism in a machine tool for enabling a cutting tool to be displaced relative to the workpiece to accurately control a dimension being machined.

Another object of the invention is to provide a hydraulic tracer control circuit for a machine tool which incorporates hydraulically actuated means for varying the position of the cutting tool relative to the workpiece in order to machine the workpiece to a predetermined desired dimension.

Figure 1:
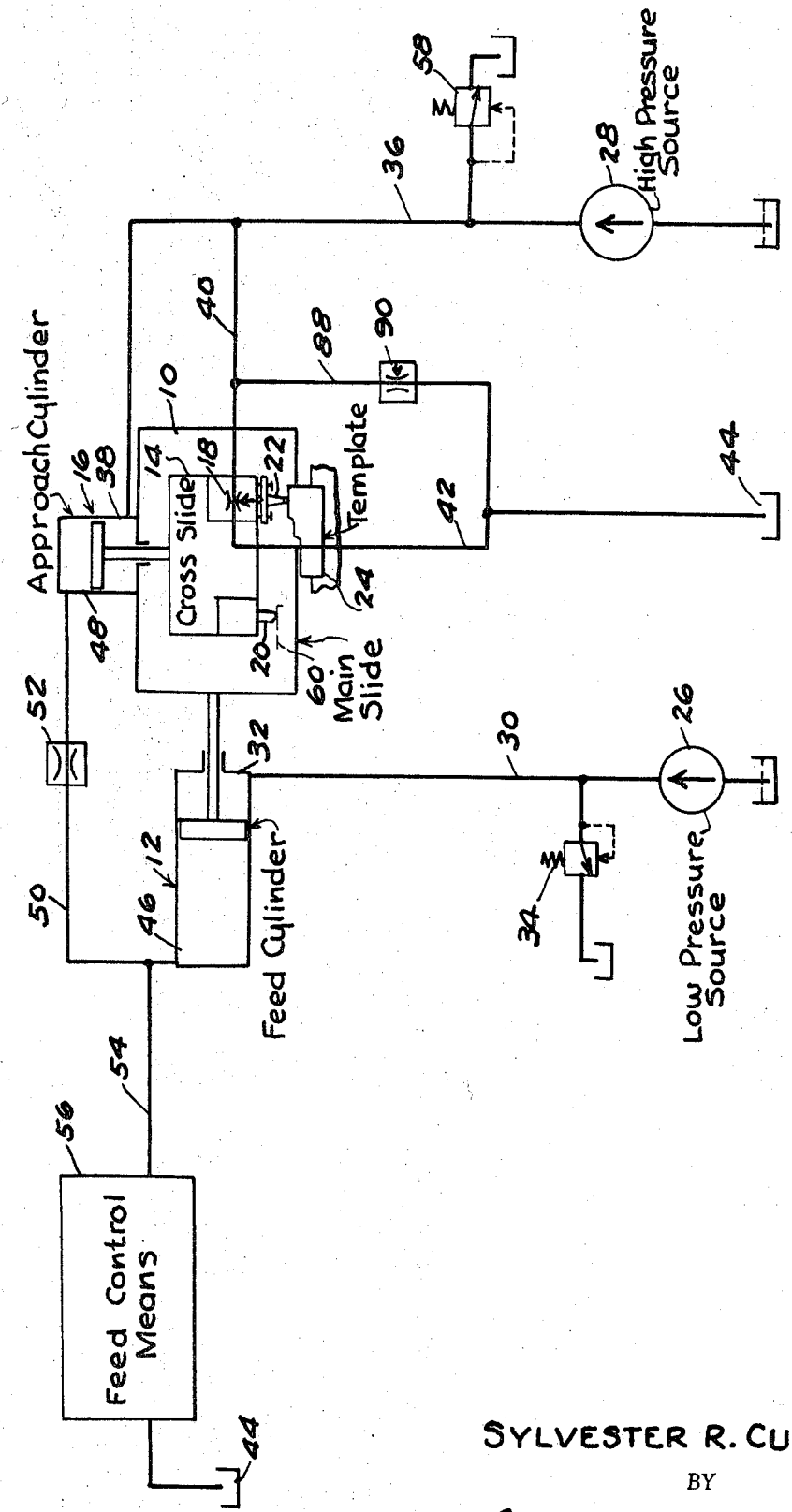
FIG. 1 is a highly simplified hydraulic tracer control circuit embodying the size control means of the present invention.

The tracer control circuit illustrated in FIG. 1 is generally the same in principle and in operation as the tracer control circuit shown and described in my previously referred to patent. However, the circuit shown in FIG. 1 is in a much simplified form and illustrates only the basic components required for an understanding of the present invention. All directional valves and other control valves not essential to an understanding of the present invention are not shown in FIG. 1.

The tracer control circuit illustrated in FIG. 1 is shown in conjunction with a lathe having a main slide 10 actuated by a feed cylinder 12 and a cross-slide 14 actuated by an approach cylinder 16. The main tracer control valve 18 and the cutting tool 20 are mounted on cross-slide 14. Valve 18 includes a stylus 22 adapted to contact and follow the contour of a template 24 which is fixedly mounted on the lathe.

The source of pressure for operating cylinders 12 and 16 is derived from two hydraulic pumps designated 26 and 28, respectively. Pump 26 may be referred to as the low pressure pump capable of developing a relatively low, substantially constant pressure of, for example, 400 lbs. per square inch. Pump 28 on the other hand may be referred to as the high pressure pump which is capable of instantaneously developing a relatively high pressure, for example, 1,000 lbs. per square inch. Pump 26 is connected by a feed line 30 with the rod end 32 of cylinder 12. The maximum pressure developed in feed line 30 is controlled by the setting of a relief valve 34. Pump 28 is connected by a feed line 36 with the rod end 38 of cylinder 16. A branch feed line 40 connects feed line 36 with an inlet port of valve 18. The outlet of valve 18 is connected by a drain line 42 to tank as at 44. The head end 46 of cylinder 12 and the head end 48 of cylinder 16 are connected by a common discharge line 50 in which there is arranged a flow control valve 52 for stability purposes. The oil discharged from the head ends of cylinders 12 and 16 is directed to tank 44 through a line 54 and a feed control means 56. Feed control means 56 may be a flow control valve, a feed pump or any other means for controlling the flow from cylinders 12 and 16 to tank at a predetermined rate.

As is clearly disclosed in my prior patent, the operation of the tracer control circuit illustrated in FIG. 1 basically involves the balancing of the pressure in feed line 36, which feeds the rod end of cylinder 16, against the pressure in feed line 30 which, through cylinder 12 and line 50, is applied to the head end of cylinder 16. The maximum pressure in feed line 38 is limited by the setting of a relief valve 58. However, the pressure obtaining at any particular instant in feed line 36 is determined by the extent to which the flow through valve 18 is restricted by stylus 22. As the restriction in valve 18 increases, the pressure in line 36, developed by pump 28, increases and, accordingly, the pressure in the rod end of cylinder 16 also increases and retracts the cross-slide when it exceeds the pressure in the head end of cylinder 16. The head end of cylinder 16 is pressurized by the back pressure developed by the pressure drop across the feed control means 56. Thus with both pumps 26, 28 operating and with the system arranged as shown in FIG. 1 stylus 22 will engage template 24 and follow the contour thereof while moving in a direction from right to left. Cutting tool 20 will follow a path corresponding to the path of travel of stylus 22 and machine a corresponding contour on the workpiece which is generally designated 60.

Figure 2:
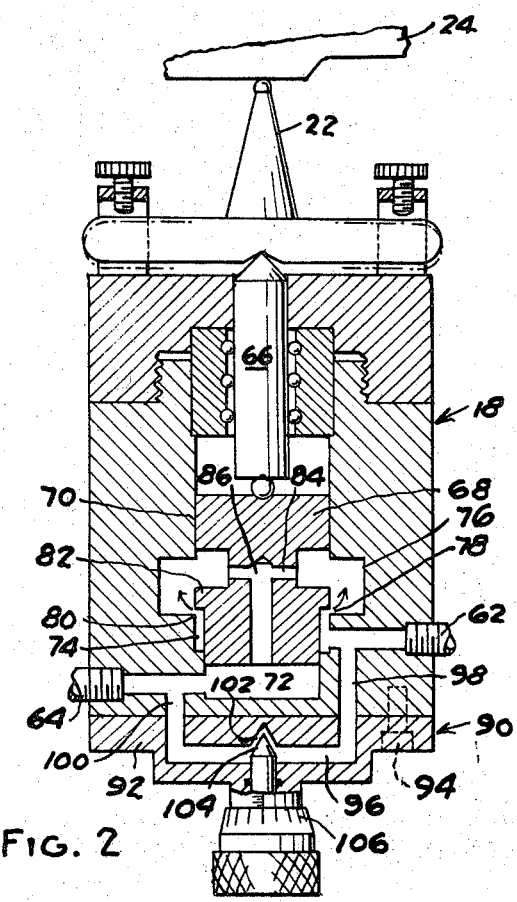
FIG. 2 is a sectional view of the main tracer control valve showing the size control means of the present invention mounted thereon.

The actual operation of valve 18 is best illustrated in FIG. 2 wherein the inlet port to which feed line 40 is connected is designated 62 and the outlet port to which drain line 42 is connected is designated 64. Stylus 22 bears against a pin 66 which in turn bears against one end of a piston 68. The upper enlarged end of piston 68 is slideably arranged in a bore 70. The lower smaller end of piston 68 is slideably arranged within a bore 72 of lesser diameter than bore 70. Outlet port 64 communicates with bore 72. Inlet port 62 communicates with an annular chamber 74. Chamber 74 in turn communicates with an enlarged chamber 76 through an annular orifice 78 defined by a shoulder 80 at the upper end of annular chamber 74 and an annular shoulder 82 on piston 68. A plurality of radial passageways 84 on piston 68 communicate with the enlarged chamber 76 at their outer ends and at their inner end passageways 84 communicate with an axial passageway 86 extending downwardly in piston 68 to the chamber defined by the smaller bore 72. With this arrangement the pressure at inlet port 62 varies in accordance with the restriction at the annular orifice 78 which is in turn determined by the position of stylus 22. As the stylus is deflected by engagement with template 24, piston 68 is shifted downwardly to provide greater restriction at annular orifice 78 and to thereby increase the pressure at inlet port 62 and in feed line 36. The oil flowing through annular orifice 78 and into chamber 76 is directed to the small bore portion 72 through passageways 84, 86 and is discharged from the valve to tank through outlet port 64.

The above description briefly summarizes the arrangement and operation of the control circuit shown and described in my previously referred to patent. The innovation provided by the present invention to the control circuit shown in FIG. 1 involves a bypass passageway 88 which, as diagrammatically shown in FIG. 1, is connected to branch feed line 40 at one end and with discharge line 42 at the other end. Passageway 88 is designed to divert oil around valve 18. The flow of oil through passageway 88 is controlled by a manually adjustable valve 90.

In the specific arrangement illustrated in FIG. 2 valve 90 comprises a valve body 92 which is mounted as by screws 94 to the lower end of valve 18. Valve body 92 is formed with a passageway 96 therein which at one end communicates with the passageway 98 extending to inlet port 62 and which at its opposite end communicates with a passage 100 extending to outlet port 64. An orifice 102 in passageway 96 is controlled in size by a manually adjustable needle valve 104. Needle valve 104 is actuated by a micrometer mechanism 106 which visually indicates the position of needle valve 104 and thus the degree of restriction of orifice 102.

With needle valve 104 completely blocking bypass passageway 96 all of the oil flowing through valve 18 by necessity has to flow through the restricted annular orifice and, as previously described, piston 68 stabilizes at some position wherein the size of orifice 78 is such that the pressure in the rod end 38 of cylinder 16 is balanced against the pressure in the head end of cylinder 16. This produces a fixed pressure of the stylus against the template and in turn a fixed position of cross-slide 14 and tool 20 relative to workpiece 60.

When needle valve 104 is actuated to permit a flow-through bypass passageway 96 the micrometer operated needle valve 104 is exposed to a pressure drop between inlet port 62 and outlet port 64. The more valve 104 is opened the greater is the flow through passageway 96 and a greater amount of oil is diverted around orifice 78. At any given setting of needle valve 104 a predetermined amount of flow is diverted around orifice 78. Thus with a particular setting of valve 104, for the pressure in feed line 36 to balance the pressure in the head end of cylinder 16, piston 68 must shift downwardly to reduce the gap at orifice 78. This requires a greater deflection of stylus 22 relative to template 24 and results in the cross slide 14 moving closer to the workpiece 16. Since tool 20 is mounted to move with cross-slide 14 it follows that tool 20 will be moved closer to the work and reduce the diameter being machined by the extent to which the cross slide has been moved toward the work.

In view of the arrangement of orifice 102 and the micrometer screw actuated needle valve 104 a very precise and fine control of the amount of oil bypassed through passageway 96 can be obtained. Even with micrometer screws of commercial tolerances one complete revolution of the screw could be designed to vary the flow through passageway 96 so that the actual distance through which the cross-slide is displaced is as little as .001". It is obvious that such fine adjustment cannot be obtained with microslides as conventionally manufactured. The cost of building a microslide to such tolerances would be prohibitive.

Figure 3:
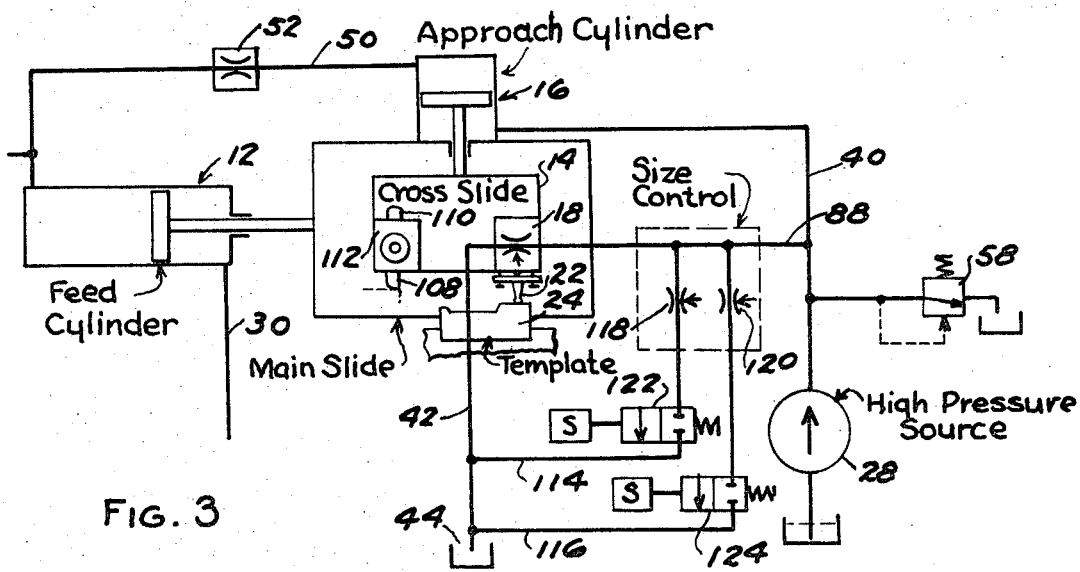
FIG. 3 is a hydraulic tracer control circuit of the type illustrated in FIG. 1 and embodying a modified form of size control to accommodate a plurality of cutting tools.

It is not uncommon in tracer controlled machine tools to employ a plurality of cutting tools. The replacement or resetting of such cutting tools due to breakage or wear poses the same problems as discussed above but to an even greater extent. The present invention is equally adapted to tracer control circuits wherein the machine tool is provided with a plurality of sequentially operated cutting tools. This arrangement is illustrated in FIG. 3 wherein two cutting tools 108, 110 are mounted on cross-slide 14 and are shown by way of example adapted to be indexable into operative position by a rotatable tool block 112. In this arrangement two bypass passageways 114, 116 are arranged in parallel around valve 18. A manually adjustable needle valve 118 is arranged in bypass passageway 114 and a similar needle valve 120 is arranged in bypass passageway 116. Within each passageway there is also arranged solenoid operated blocking valves 122, 124 selectively operable in accordance with each of the two cutting tools 108, 110 is operative. Thus, as tool 108 is machining the adjustment required in the relative position between tool 108 and workpiece 60 can be obtained by manipulating valve 118 while the solenoid of valve 122 is energized to permit flow through bypass passageway 114. On the other hand when tool 110 is operative the solenoid of valve 124 is energized and the relative position of the tool and workpiece is obtained by adjusting needle valve 120. The template associated with tool 110 is not illustrated.

Figure 4:
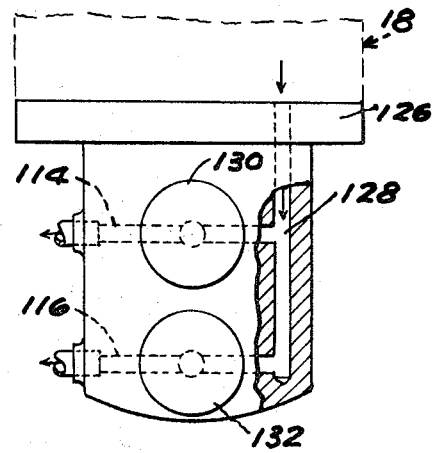
FIG. 4 is an elevational view, partly in section, of a size control valve unit for use in the circuit illustrated in FIG. 3.

In FIG. 4 the specific bypass valve structure usable with the circuit shown in FIG. 3 is illustrated. In this arrangement a bypass passageway is formed in a valve body 126 and is designated 128. The micrometer screw mechanism for valve 118 is designated 130 and the micrometer screw mechanism for valve 120 is designated 132. Valve body 126 is adapted to be mounted directly on the body of valve 18 as is shown in FIG. 2. Passageway 128 registers with passageway 98; however, with the arrangement of FIG. 4, passageway 100 in the valve illustrated in FIG. 2 would be blocked since the bypass passageways 114, 116 downstream of valves 188 and 120 would be connected to tank independently of valve 18.

I claim:

1. In a hydraulic control circuit for a machine tool wherein the position of the cutting tool relative to the work is governed by a hydraulic cylinder connected by a feed line to a source of fluid under pressure and the feed line is also connected to a main control valve which is in turn controlled by a template controlled actuating means to variably restrict the flow through the valve and thereby vary the back pressure in said feed line and control the actuation of said cylinder, said cylinder acting to feed the tool into the work in response to a drop in pressure in said feed line and away from the work in response to an increase in pressure in said feed line, that improvement which comprises means connected to the feed line and forming a bypass passageway around said main control valve and adjustable restricting means in said bypass passageway for controlling the amount of pressure fluid diverted around said main valve whereby a predetermined increase in the restriction produced by said restricting means results in movement of the tool away from the work to a predetermined extent and a predetermined decrease in the restriction produced by the restricting means results in movement of the tool toward the work to a predetermined extent.

2. The combination called for in claim 1 wherein said restricting means are manually adjustable.

3. The combination called for in claim 1 wherein said restricting means include a manually adjustable needle valve.

4. The combination called for in claim 1 wherein the machine tool includes a plurality of cutting tools sequentially controlled by said cylinder and said adjustable restricting means comprises a plurality of flow restricting devices in said bypass passageway and means for selectively rendering each of said restricting devices operative to restrict said bypass passageway.

5. The combination called for in claim 4 wherein said restricting devices are arranged in parallel relative to the bypass passageway.

6. The combination called for in claim 1 wherein said main control valve has a valve body provided with an inlet port to which said feed line is connected, said valve body also having an outlet port, said bypass passageway including means forming a passageway in said valve body communicating at one end with said inlet port and at its opposite end with said outlet port.

7. In a hydraulic control circuit for a machine tool for governing the operation of a cylinder arranged to position a cutting tool relative to a workpiece and thereby determine the machined dimension of the workpiece the combination comprising two sources of hydraulic pressure, one being capable of developing a substantially higher pressure than the other, a main control valve, a feed line connecting said valve with said source of higher pressure, template-controlled actuating means for variably restricting the flow through said valve and thereby vary the pressure in said feed line, means connecting said feed line with one end of said cylinder, means operatively connecting the source of lower pressure with the opposite end of said cylinder, said actuating means being adapted to variably restrict the flow through the valve such that the pressure at one end of the cylinder is balanced by the pressure at the other end thereof to thereby position the cutting tool at a predetermined location relative to the workpiece, means connected with said feed line and forming a bypass passageway around said valve, adjustable restriction means in said bypass passageway for controlling the amount of fluid diverted around said valve and to thereby vary the restriction required in said valve to balance the pressure in said feed line against the pressure at said opposite end of said cylinder.

8. The combination called for in claim 7 wherein the restricting means in said bypass passageway are manually adjustable to vary the flow therethrough by relatively small increments.

9. The combination called for in claim 8 wherein said restricting means comprises a needle valve.

10. The combination called for in claim 7 wherein the machine tool includes a plurality of cutting tools adapted to be sequentially controlled by said cylinder and wherein said restricting means comprises a plurality of flow restricting devices in said bypass passageway and means for rendering each of said devices selectively operable.

11. The combination called for in claim 10 wherein said restricting devices are arranged in parallel relative to said bypass passageway.

12. In a tracer control circuit for governing the operation of a pair of hydraulic cylinders arranged to feed a cutting tool in angularly related directions the combination of two sources of hydraulic pressure, one being capable of developing a higher pressure than the other, a tracer control valve having flow restricting means therein, a feed line connecting the tracer control valve with the source of high pressure, template controlled actuating means for controlling the tracer valve to variably restrict the flow therethrough and thereby varying the pressure in said feed line, means connecting the feed line with one end of one of said cylinders, a feed line extending from said other source of lower pressure to one end of the other cylinder, a common discharge line connecting the other ends of said cylinders, means for controlling the flow in said discharge line to drain and to thereby produce a back pressure in said common discharge line, means forming a bypass passageway around said restricting means in said tracer control valve and adjustable restricting means in said bypass passageway for varying the amount of flow in said feed line diverted around the restricting means in the tracer valve to thereby vary the degree of restriction required in said tracer valve to maintain an equilibrium condition between the opposite ends of said one cylinder.

13. The combination called for in claim 12 wherein the restricting means in said bypass passageway are manually adjustable.

14. The combination called for in claim 12 wherein the restricting means in said bypass passageway are adjustable to completely stop the flow in said bypass passageway.

15. The combination called for in claim 12 wherein the restricting means in said bypass passageway are adjustable to vary the flow therein by relatively small increments.

16. The combination called for in claim 12 wherein the machine tool is provided with a plurality of said cutting tools adapted to be sequentially controlled by said cylinders and wherein said restricting means in said bypass passageway comprises a plurality of flow restricting devices and means for rendering each of said devices selectively operable.

17. The combination called for in claim 16 wherein said restricting devices are arranged in parallel relative to said bypass passageway.

References Cited

UNITED STATES PATENTS

| | | | |
|---|---|---|---|
| 2,331,337 | 10/1943 | Meyer | 91—37X |
| 2,897,651 | 8/1959 | Bregenzer | 91—37X |
| 2,940,263 | 6/1960 | Cudnohufsky | 91—37X |
| 3,104,591 | 9/1963 | Cudnohufsky | 91—37X |

EDGAR W. GEOGHEGAN, Primary Examiner

U.S. Cl. X.R.

91—37; 60—97; 251—3